US008764345B2

(12) United States Patent
Ardavanis

(10) Patent No.: US 8,764,345 B2
(45) Date of Patent: Jul. 1, 2014

(54) METHOD OF ABANDONING AN UNDERWATER PIPELINE ON THE BED OF A BODY OF WATER

(75) Inventor: Kimon Ardavanis, Sanremo (IT)

(73) Assignee: Saipem S.p.A., San Donato Milanese (IT)

( * ) Notice: Subject to any disclaimer, the term of this patent is extended or adjusted under 35 U.S.C. 154(b) by 107 days.

(21) Appl. No.: 13/502,973

(22) PCT Filed: Oct. 21, 2010

(86) PCT No.: PCT/IB2010/002700
§ 371 (c)(1),
(2), (4) Date: Jul. 2, 2012

(87) PCT Pub. No.: WO2011/048480
PCT Pub. Date: Apr. 28, 2011

(65) Prior Publication Data
US 2012/0269579 A1 Oct. 25, 2012

(30) Foreign Application Priority Data
Oct. 23, 2009 (IT) ............................. MI2009A1852

(51) Int. Cl.
*F16L 1/12* (2006.01)

(52) U.S. Cl.
USPC ........................ 405/184.4; 405/158; 405/166

(58) Field of Classification Search
USPC .................... 405/158, 166, 168.1, 173, 184.4
See application file for complete search history.

(56) References Cited

U.S. PATENT DOCUMENTS

| 3,835,707 | A * | 9/1974 | Rosa et al. ...................... 73/291 |
| 3,890,693 | A * | 6/1975 | Eagleton et al. ................ 29/429 |
| 4,073,157 | A * | 2/1978 | Aylmer et al. ................. 405/170 |
| 6,729,802 | B2 * | 5/2004 | Giovannini et al. .......... 405/158 |
| 2003/0099515 | A1 * | 5/2003 | Giovannini et al. .......... 405/158 |
| 2005/0265788 | A1 * | 12/2005 | Renkema ....................... 405/158 |
| 2007/0177944 | A1 | 8/2007 | Smith et al. |
| 2007/0248418 | A1 * | 10/2007 | Steenhuis et al. ............. 405/158 |

FOREIGN PATENT DOCUMENTS

| EP | 1 850 043 A2 | 10/2007 |
| GB | 1 546 576 | 5/1979 |
| WO | WO 2009/002142 A1 | 12/2008 |
| WO | WO 2009/082191 A2 | 7/2009 |

OTHER PUBLICATIONS

International Search Report and Written Opinion for International Appl. No. PCT/IB2010/002700, European Patent Office, The Netherlands, mailed on May 1, 2011, 8 pages.

\* cited by examiner

*Primary Examiner* — Benjamin Fiorello
(74) *Attorney, Agent, or Firm* — Sterne, Kessler, Goldstein & Fox P.L.L.C.

(57) ABSTRACT

A method of abandoning an underwater pipeline on the bed of a body of water from a laying vessel includes the steps of lowering the free end of the pipeline into the body of water and onto the bed of the body of water using a first and second rope, both connected to the free end of the pipeline and extending from the laying vessel to the free end of the pipeline. The method also includes disconnecting the first rope from the free end of the pipeline, once the free end of the pipeline is laid on the bed of the body of water; and rewinding the first rope onto the laying vessel, while the second rope is still connected to the free end of the pipeline.

11 Claims, 3 Drawing Sheets

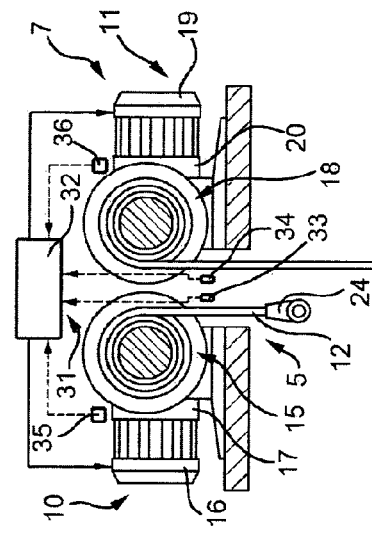
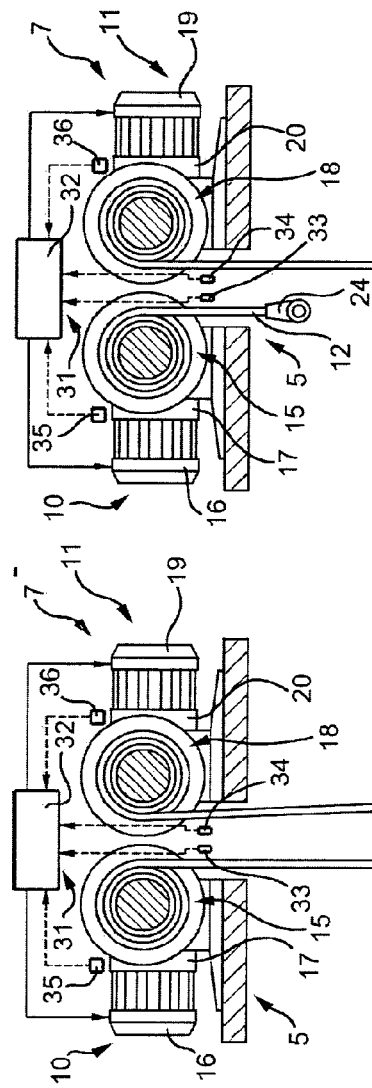
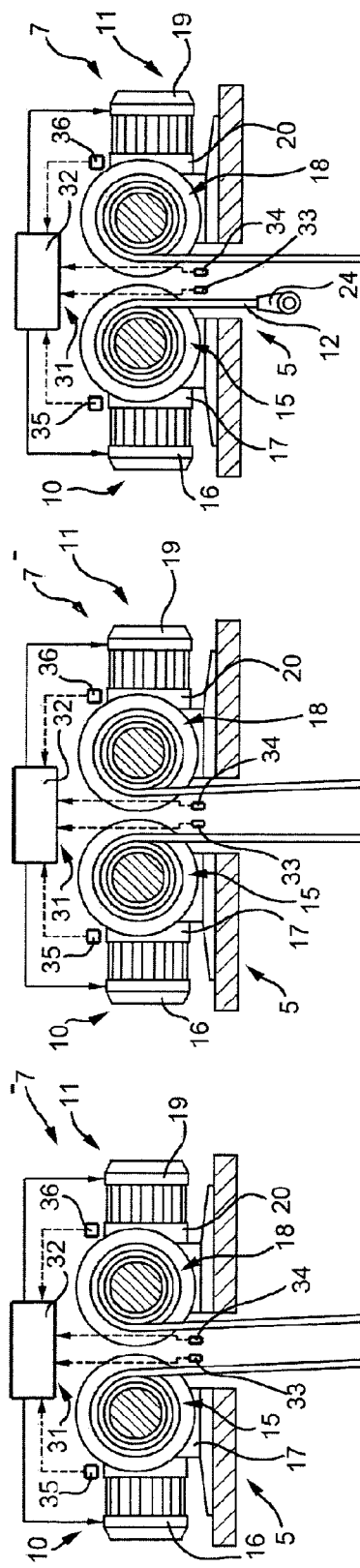
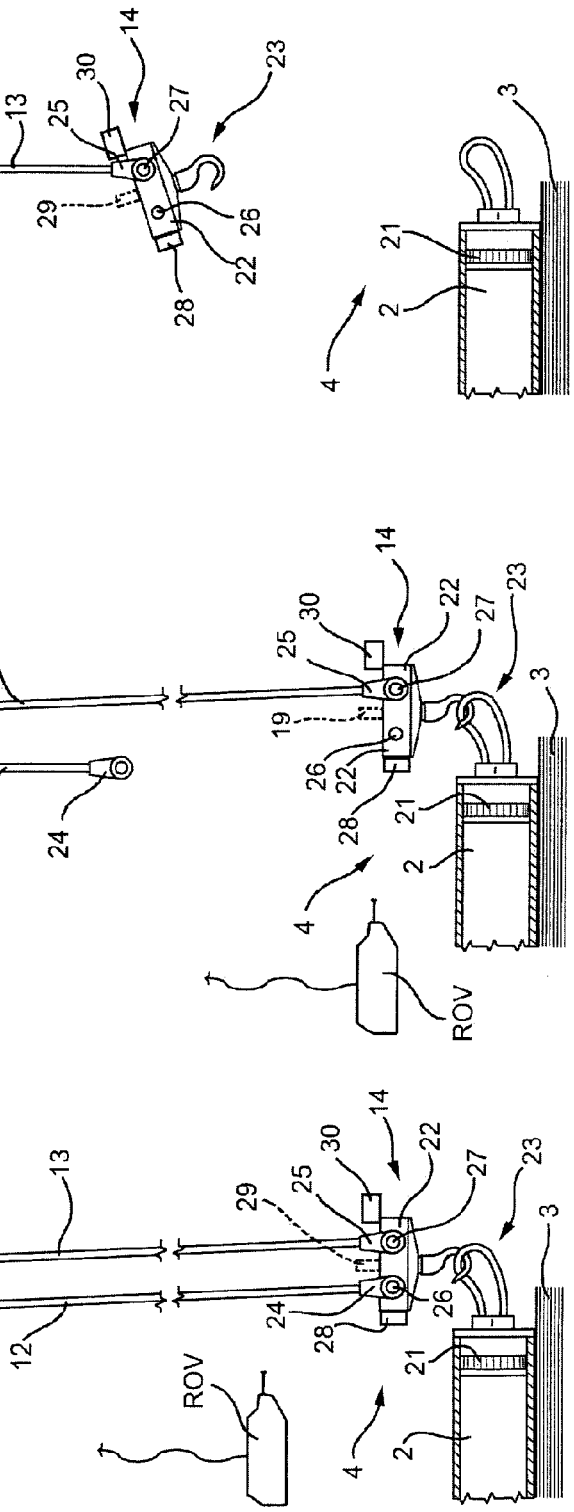

METHOD OF ABANDONING AN UNDERWATER PIPELINE ON THE BED OF A BODY OF WATER

TECHNICAL FIELD

The present invention relates to a method of abandoning an underwater pipeline on the bed of a body of water from a laying vessel.

BACKGROUND ART

An underwater pipeline is normally assembled on board a laying vessel, and laid on the bed of a body of water as it is assembled. One commonly used type of laying vessel comprises a substantially horizontal, on-board assembly line; and a curved lay ramp that guides part of the pipeline as it is lowered onto the bed. This laying method is known as S-laying, because of the shape of the pipeline between the laying vessel and the bed.

On another commonly used type of laying vessel, the pipeline is assembled in a substantially vertical lay tower and released substantially vertically. This laying method is known as J-laying, because of the shape of the pipeline between the laying vessel and the bed, and is preferable to S-laying when working in deep water.

Substantially two situations make it necessary to abandon the pipeline on the bed: bad weather conditions making laying work dangerous; and completion of the pipeline.

The pipeline must be recovered off the bed to resume laying and assembly work interrupted by bad weather.

Methods of abandoning and/or recovering underwater pipelines comprise shutting down assembly of the pipeline; connecting the free end of the pipeline to a hoisting assembly comprising at least one winch on the laying vessel, at least one rope, and a connecting device for connecting the rope to the pipeline; and abandoning/recovering the pipeline by winching out/up the rope. Documents EP 1,850,043 A2; U.S. 2007/0177944; WO 2009/002142; and WO 2009/082191 describe various abandoning and/or recovery methods, which employ hoisting assemblies comprising at least one winch on board the laying vessel, and one rope. Some hoisting assemblies employ a first and second winch for synchronously operating a first and second rope to share the load exchanged between the pipeline and the laying vessel.

The load between the laying vessel and the pipeline varies between a maximum and minimum, and depends on the length of pipeline raised off the bed. When abandoning the pipeline, load is maximum at the initial stage, when a long portion of the pipeline is raised off the bed. And, conversely, when recovering the pipeline, load is maximum at the final stage, when, again, a long portion of the pipeline is raised off the bed.

The load between the pipeline and the laying vessel, in fact, is a function of the weight per linear meter of the pipeline, and the length of pipeline raised off the bed.

Whether it comprises one or more winches, the hoisting assembly must have a total capacity greater than the actually short-lived maximum load between the pipeline and the laying vessel. Which means the laying vessel as a whole must be equipped with a hoisting assembly capable of hoisting more than the maximum load exchangeable between the pipeline and the vessel. Deepwater laying vessels, normally equipped with a J-lay tower, must therefore be equipped with hoisting assemblies of over 1500-ton capacity when working with extra-large-diameter pipelines.

The first and second rope are normally metal-stranded, substantially the same length as or longer than the depth of the body of water, and of a diameter consistent with the maximum load for which they are designed. More specifically, the first and second rope may be as long as 1500 meters, with diameters ranging between 0.08-0.25 meters, which makes them extremely bulky and expensive.

A major problem posed by hoisting devices comprising a first and second winch and a first and second rope is the tendency of the ropes to become entangled as they are wound up.

That is, once the pipeline is abandoned on the bed of the body of water, the first and second rope are disconnected and rewound onto the laying vessel. Given the depth of the body of water, rewinding the ropes takes some time, during which they invariably become crossed and entangled, also in view of the fact that the pipeline is abandoned in severe weather and surge conditions.

Antirotation ropes are available on the market, but ropes capable of lifting and lowering exceptional loads are normally twisted-strand types which, under their own weight, rotate about their longitudinal axis as they are rewound. And, since the ends of the ropes are free, this rotation causes the ropes to swing, thus increasing the danger of them becoming entangled.

Entangling of the first and second rope may result in incomplete or slow rewinding, and, in some cases, in considerable downtime to disentangle them.

DISCLOSURE OF INVENTION

It is an object of the present invention to provide a method of abandoning an underwater pipeline on the bed of a body of water from a laying vessel, designed to eliminate the drawbacks of the known art.

Another object of the present invention is to provide a method of abandoning an underwater pipeline on the bed of a body of water, designed to rewind the first and second rope quickly and effectively.

According to the present invention, there is provided a method of abandoning an underwater pipeline on the bed of a body of water from a laying vessel, the method comprising the steps of lowering the free end of the pipeline into the body of water and onto the bed of the body of water using a first rope and a second rope, both connected to the free end of the pipeline and extending from the laying vessel to the free end of the pipeline; disconnecting the first rope from the free end of the pipeline, once the free end of the pipeline is laid on the bed of the body of water; and rewinding the first rope onto the laying vessel, while the second rope is still connected to the free end of the pipeline.

The present invention reduces the risk of the first and second rope becoming entangled, by preventing them from both being located simultaneously in the body of water with their respective free ends in close proximity to each other. Contrary to what might be expected, rewinding the first and second rope separately is often faster than rewinding both simultaneously, by enabling faster rewinding of the first, and particularly, the second rope.

In a preferred embodiment of the present invention, the method comprises unwinding the first rope enough to recover the elastic deformation of the first rope before it is disconnected from the free end of the pipeline resting on the bed of the body of water.

This prevents the first rope from springing back and possibly curling about the second rope.

In another preferred embodiment of the present invention, the method comprises positioning the laying vessel with respect to the free end of the pipeline, so the first and second rope slope with respect to the vertical between the laying vessel and the bed of the body of water.

By so doing, the first rope, when released, is moved under its own weight away from the second rope by a distance directly proportional to the depth and slope of the second rope.

BRIEF DESCRIPTION OF THE DRAWINGS

A number of non-limiting embodiments of the present invention will be described by way of example with reference to the accompanying drawings, in which:

FIGS. 2A-2C show side views of three stages in recovery of the first and second rope in accordance with the present invention;

BEST MODE FOR CARRYING OUT THE INVENTION

Figure 1C:
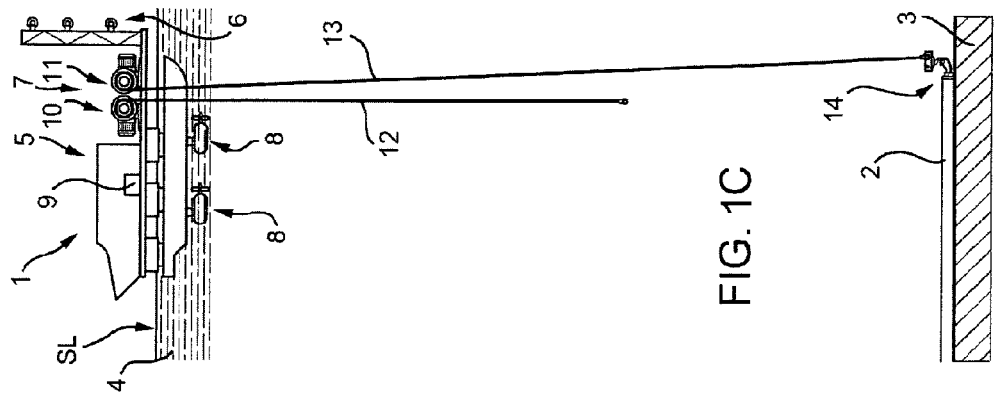
FIGS. 1A-1C show side views of three operating stages of a laying vessel equipped with a hoisting assembly designed to implement the method according to the present invention.
Figure 1B:
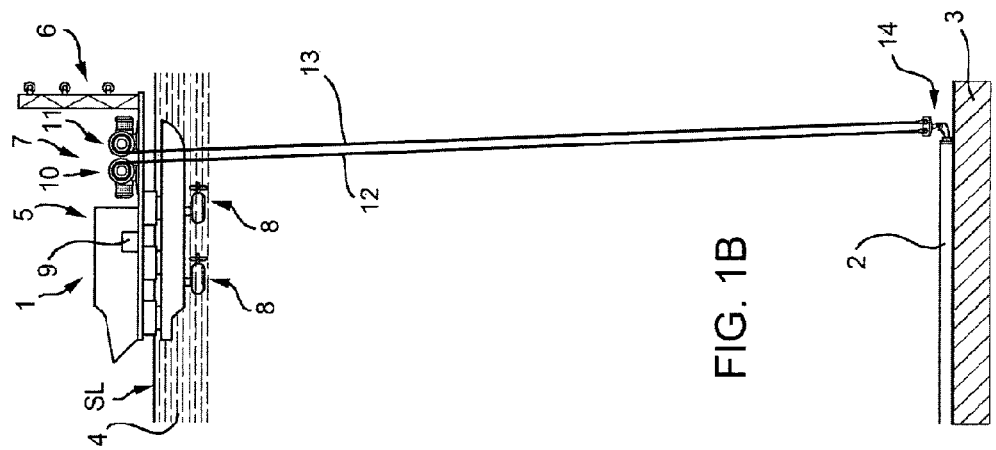
Figure 1A:
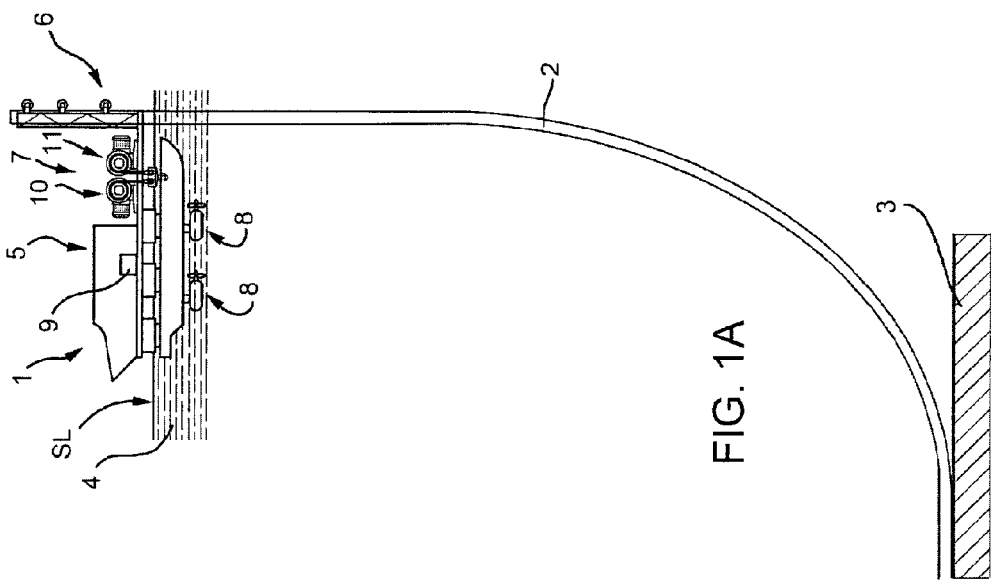

Number 1 in FIG. 1A indicates as a whole a laying vessel assembling and laying an underwater pipeline 2 on the bed 3 of a body of water 4 of level SL.

In the example shown, laying vessel 1 comprises a floating structure 5; a J-lay tower 6; a hoisting assembly 7 for abandoning and recovering pipeline 2; a known dynamic positioning system, of which FIGS. 1A-1C only show the thrusters 8; and a receiving unit 9, shown schematically and defined, in the example shown, by passive acoustic sensors.

FIG. 1A shows the operating stage in which pipeline 2 is assembled in J-lay tower 6 and gradually released by gripping assemblies (not shown) associated with tower 6 and for gripping pipeline 2.

When completed, or in bad weather, pipeline 2 must be abandoned on bed 3.

The abandoning method comprises connecting the free end of pipeline 2 to hoisting assembly 7; and easing pipeline 2 onto bed 3. As the abandoning operation proceeds, the portion of pipeline 2 detached from bed 3 and, hence, the load between pipeline 2 and laying vessel 1 get smaller, which means the maximum load between laying vessel 1 and pipeline 2 occurs at the initial stage in abandoning pipeline 2.

In FIG. 1B, pipeline 2 is laid on bed 3 with both ropes 12 and 13 connected; and, in FIG. 1C, the pipeline is laid on bed 3, rope 12 is being rewound, and rope 13 is still connected to pipeline 2.

With reference to FIGS. 2A-2C, hoisting assembly 7 comprises two winches 10 and 11; two ropes 12 and 13; and a connecting device 14 for connecting ropes 12 and 13 to the free end of pipeline 2.

Winch 10 is mounted on floating structure 5, and comprises a drum 15 for winding and unwinding rope 12; a motor 16; and a reducer 17. Winch 11 is mounted on floating structure 5, and comprises a drum 18 for winding and unwinding rope 13; a motor 19; and a reducer 20. Ropes 12 and 13 are steel-stranded, low-torque ropes designed for the hoisting capacities of respective winches 10 and 11. Alternatively, antirotation ropes may be used when the loads exerted by the pipeline are not particularly high.

Connecting device 14 comprises a plug 21 for plugging the free end of pipeline 2; and a plate 22 with a hook 23 for connection to plug 21.

Ropes 12 and 13 have respective terminals 24 and 25 connectable to plate 22 by respective pins 26 and 27. Connecting device 14 also comprises a docking station 28 for a remote-operated vehicle ROV for disconnecting ropes 12 and 13 from plate 22. Alternatively, connecting device 14 comprises a manipulator 29, which is mounted directly on plate 22, is remote-controlled, preferably ultrasonically, and is designed to disconnect ropes 12, 13 from plate 22 and/or plate 22 from plug 21.

Connecting device 14 also comprises a signal emitter 30 for emitting preferably ultrasound signals, which indicate the position of plate 22 and are received by receiving unit 9.

Hoisting assembly 7 also comprises a control device 31 comprising a control unit 32 connected to motors 16, 19 of respective winches 10, 11; two position sensors 33, 34 for determining the position and, therefore, the speed of first and second rope 12, 13; and two sensors 35, 36 for determining the load exerted on first and second winch 10, 11.

In actual use, hoisting assembly 7 unwinds ropes 12 and 13 to lower pipeline 2 onto bed 3 of body of water 4 from laying vessel 1. Ropes 12, 13 are unwound by respective winches 10, 11 until the free end of pipeline 2 comes to rest on bed 3 of body of water 4 (FIGS. 1B and 2A); at which point, first rope 12 is disconnected from plate 22 and rewound onto laying vessel 1, while second rope 13 is left connected to the free end of pipeline 2 (FIGS. 1C, 2B).

Various options are available to determine when the free end of pipeline 2 comes to rest on bed 3. If the abandoning operation is assisted by a remote-operated vehicle ROV (FIGS. 2A, 2B), this can provide the on-board crew, in charge of abandoning pipeline 2, with images showing the position of the free end of pipeline 2. Alternatively, downlaying of the free end of the pipeline is determined by monitoring the position of ropes 12, 13 using sensors 33, 34, and the loads using sensors 35, 36: if load increases, instead of decreasing, as ropes 12, 13 are unwound, this means the free end of pipeline 2 is on the bed. This determination is possible when the weight per unit length of pipeline 2 is greater than the weight per unit length of first and second rope 12, 13. Another alternative to determine downlaying of the free end of pipeline 2 on bed 3 is to monitor the signals from emitter 30 with a receiver, e.g. receiving unit 9 on laying vessel 1 (FIGS. 1A-1C).

While rope 12 is being rewound, rope 13 is left connected and maintained taut at a given tension. Because the pipeline often has to be abandoned in severe weather conditions, tensioning of rope 13 is preferably dynamic, and control unit 32 controls motor 19 of winch 11 as a function of the load detected by sensor 35, and so that the load detected by sensor 35 remains within a given range. Keeping rope 13 taut as rope 12 is rewound reduces the risk of criss-crossing of ropes 12, 13.

In addition, before being disconnected from plate 22, rope 12 in unwound by winch 10 enough to recover the elastic deformation of rope 12 and prevent uncontrolled springback of rope 12 as it is disconnected.

Once rope 12 is rewound by winch 10, winch 11 unwinds rope 13 enough to recover the elastic deformation of rope 13. Plate 22 is then disconnected from pipeline 2, and rope 13 is rewound by winch 11 (FIG. 2C).

In a preferred embodiment, to avoid unbalancing plate 22, first and second rope 12, 13 are unwound simultaneously to recover their elastic deformation.

Preferably, laying vessel 1 is moved into and maintained in a given position with respect to the free end of pipeline 2/plate 22, so that ropes 12, 13 slope with respect to the vertical, as shown in FIGS. 1B and 2A. Laying vessel 1 is positioned by the dynamic positioning system comprising thrusters 8 (FIGS. 1A-1C) which provide for dynamically maintaining a given assigned position of laying vessel 1. The dynamic positioning system knows the position of the free end of the pipeline on bed 3 of body of water 4, and keeps laying vessel 1 in a fixed position with respect to the free end of pipeline 2, so that rope 12, when released, swings under its own weight away from rope 13 by a distance directly proportional to the depth and slope of rope 13, thus further reducing the risk of contact between ropes 12 and 13 as rope 12 is rewound.

Figure 3:
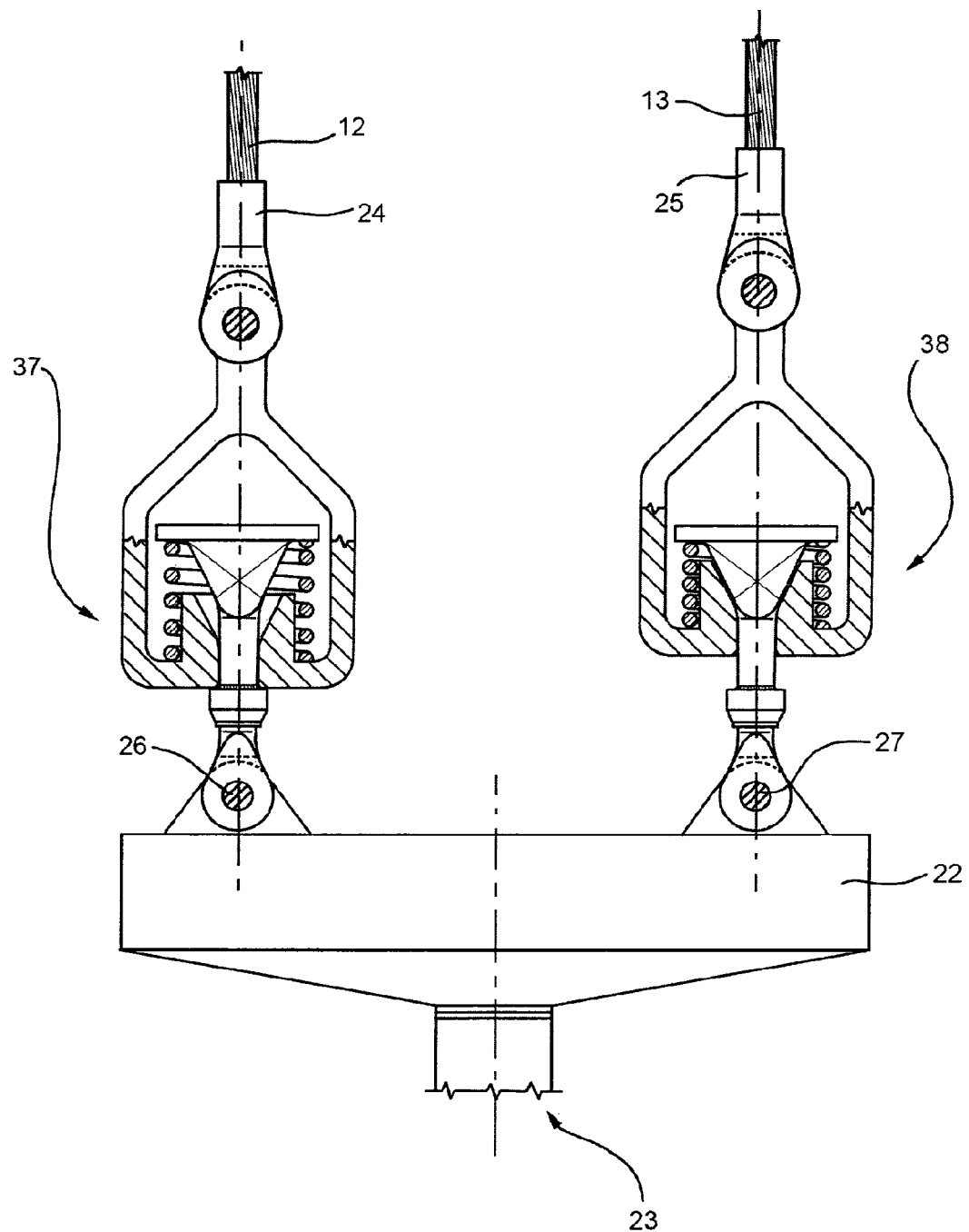
FIG. 3 shows a side view of a connecting device designed to implement the method according to the present invention.

In the FIG. 3 variation, ropes 12, 13 are connected to plate 22 by respective swivel joints 37, 38, which allow respective ropes 12, 13 to rotate about their respective longitudinal axes A1, A2. In the example shown, rotation of swivel joints 37, 38 can be locked. More specifically, swivel joints 37, 38 are locked when tensioned (swivel joint 38 connected to rope 13), and are free to rotate when not tensioned (swivel joint 37 connected to rope 12).

When unwound to recover their elastic deformation, ropes 12 and 13 are therefore free to rotate about their axes, with their ends still connected. Rotation of the ropes occurs when using other than antirotation ropes, which are not widely used on account of their high cost, and their inability to withstand heavy loads.

Clearly, changes may be made to the embodiment described of the present invention without, however, departing from the scope of the accompanying Claims.

The invention claimed is:

1. A method of abandoning an underwater pipeline on a bed of a body of water from a laying vessel, the method comprising:
   lowering a free end of the pipeline into the body of water and onto the bed of the body of water using a first rope and a second rope, both connected to the free end of the pipeline and extending from the laying vessel to the free end of the pipeline;
   disconnecting the first rope from the free end of the pipeline, once the free end of the pipeline is laid on the bed of the body of water; and
   rewinding the first rope onto the laying vessel, while the second rope is still connected to the free end of the pipeline.

2. The method as claimed in claim 1, wherein the first rope is connected to the free end of the pipeline by a swivel joint, which allows the first rope to rotate about its longitudinal axis.

3. The method as claimed in claim 1, wherein the second rope is connected to the free end of the pipeline by a swivel joint, which allows the second rope to rotate about its longitudinal axis.

4. The method as claimed in claim 1, further comprising:
   disconnecting the second rope from the free end of the pipeline; and
   rewinding the second rope onto the laying vessel.

5. The method as claimed in claim 1, further comprising positioning the laying vessel with respect to the free end of the pipeline, so that the second rope slopes with respect to the vertical between the bed of the body of water and the laying vessel.

6. The method as claimed in claim 1, further comprising:
   emitting a signal from a position in close proximity to the free end of the pipeline; and
   receiving the signal by means of a receiving unit on the laying vessel, so as to monitor the position of the free end of the pipeline.

7. The method as claimed in claim 1, further comprising:
   operating the first rope by means of a first winch, and
   operating the second rope by means of a second winch.

8. The method as claimed in claim 1, further comprising disconnecting the first rope and the second rope from the free end of the pipeline by means of a remote-operated vehicle.

9. The method as claimed in claim 1, further comprising ultrasonically remote-operating a connecting device connected to the free end of the pipeline, to the first rope, and to the second rope, and wherein the connecting device comprises at least one ultrasonically controlled manipulator.

10. A method of abandoning an underwater pipeline on the bed of a body of water from a laying vessel, the method comprising:
    lowering the free end of the pipeline into the body of water and onto the bed of the body of water using a first rope and a second rope, both connected to the free end of the pipeline and extending from the laying vessel to the free end of the pipeline;
    unwinding the first rope enough to recover an elastic deformation of the first rope, before disconnecting the first rope from the free end of the pipeline resting on the bed of the body of water;
    disconnecting the first rope from the free end of the pipeline, once the free end of the pipeline is laid on the bed of the body of water; and
    rewinding the first rope onto the laying vessel, while the second rope is still connected to the free end of the pipeline.

11. A method of abandoning an underwater pipeline on the bed of a body of water from a laying vessel, the method comprising:
    lowering the free end of the pipeline into the body of water and onto the bed of the body of water using a first rope and a second rope, both connected to the free end of the pipeline and extending from the laying vessel to the free end of the pipeline;
    disconnecting the first rope from the free end of the pipeline, once the free end of the pipeline is laid on the bed of the body of water;
    rewinding the first rope onto the laying vessel, while the second rope is still connected to the free end of the pipeline; and
    unwinding the second rope enough to recover an elastic deformation of the second rope, when the free end of the pipeline rests on the bed of the body of water, and the second rope is connected to the free end of the pipeline.

* * * * *